United States Patent [19]

Gruaz et al.

[11] Patent Number: 5,016,008

[45] Date of Patent: May 14, 1991

[54] DEVICE FOR DETECTING THE POSITION OF A CONTROL MEMBER ON A TOUCH-SENSITIVE PAD

[75] Inventors: Daniel Gruaz, Montigny le Bretonneux; Claude Marchal, Garancieres, both of France

[73] Assignee: Sextant Avionique, Meudon La Foret, France

[21] Appl. No.: 197,431

[22] Filed: May 23, 1988

[30] Foreign Application Priority Data

May 25, 1987 [FR] France ............................. 87 07323

[51] Int. Cl.⁵ ...................... H03K 17/96; G01B 21/00
[52] U.S. Cl. ........................................ 341/33; 340/706
[58] Field of Search .......................... 341/33, 26, 22; 340/709, 706, 712; 200/DIG. 1

[56] References Cited

U.S. PATENT DOCUMENTS

| 3,657,475 | 4/1972 | Peronneau | 178/18 |
| 4,281,323 | 7/1981 | Burnett et al. | 341/33 |
| 4,736,191 | 4/1988 | Matzke et al. | 340/709 |

FOREIGN PATENT DOCUMENTS 2538581 6/1984 France.

OTHER PUBLICATIONS

Measures Regulation Automatisme, vol. 42, No. 9, Sep. 1977, pp. 69-73; C. Piguet et al.: "Entrée de données pour montre multifonctionnelle", *p. 72, chapitre 5-p. 73, chapitre 6*.

IBM Technical Disclosure Bulletin, vol. 23, No. 6, Nov. 1980; H. S. Hoffman, Jr.: "Exact Position Detection with Finger Point and Feedback", *En entier*.

Primary Examiner—Alvin Oberley
Attorney, Agent, or Firm—Sixby, Friedman, Leedom & Ferguson

[57] ABSTRACT

The device in accordance with the invention includes a series of detection areas (2) on the touch-sensitive pad, an analog circuit for applying a detection coefficient to each detection area (2), which coefficient corresponds to the degree the detection area is overlapped by the control member, and determines a median point of the detection areas as weighted by their respective detection coefficients.

4 Claims, 1 Drawing Sheet

DEVICE FOR DETECTING THE POSITION OF A CONTROL MEMBER ON A TOUCH-SENSITIVE PAD

The present invention relates to a device for detecting the position of a control member on a pad.

BACKGROUND OF THE INVENTION

Devices are known for detecting the position of a control member on a pad, for example for controlling the position of a pointer on a video screen associated with a computer, with the position of the control member on the pad having the ultimate purpose of selecting a computer function or of changing data contained in the computer. It is important to be able to distinguish between a large number of control points on the pad in order to provide a wide selection range for functions or associated data. When using a magnetic pad associated with a control stylus, it is possible, within limits, to increase the number of distinguishable control points by reducing the active area of the stylus.

When using a touch-sensitive pad the control member is constituted by the finger of an operator. Finger sizes vary between operators and cannot be modified.

French patent specification No. 2 538 581 describes a device for determining the position of a finger between detection areas. However, this device requires a delay to be inserted prior to signal transmission.

An object of the present invention is to provide a device for detecting the position of a control member on a touch-sensitive pad, and having a short response time.

SUMMARY OF THE INVENTION

In order achieve this object, the present invention provides a detection device of the type comprising a series of capacitive detection areas, wherein an analog capacitive circuit attributes a detection coefficient to each area, which coefficient is a function of the amplitude of a signal emitted by the capacitive circuit, said amplitude being itself a function of the degree to which the detection area is overlapped by the control member, the device further comprising means for determining a median point (R) of the detection areas as weighted by their detection coefficients.

Thus, the exact position of the finger is immediately determined on the basis of the signal emitted by the capacitive circuits associated with respective ones of the areas overlapped by the control member.

In an advantageous version of the invention, the device includes means for selecting detection areas having a high degree of overlap from amongst all of the detection areas. This simplifies determining the median point of the detection areas as weighted by their detection coefficients.

In a preferred embodiment of this version of the invention, the device includes means for attributing an origin to one of the areas having a high degree of overlap. Thus, once the original weighting has been performed, the median point of the detection areas having a high degree of overlap is determined in the same way regardless of the position of said detection areas on the pad.

BRIEF DESCRIPTION OF THE DRAWINGS

An embodiment of the invention is described by way of example with reference to the accompanying drawings, in which.

MORE DETAILED DESCRIPTION

Figure 1:
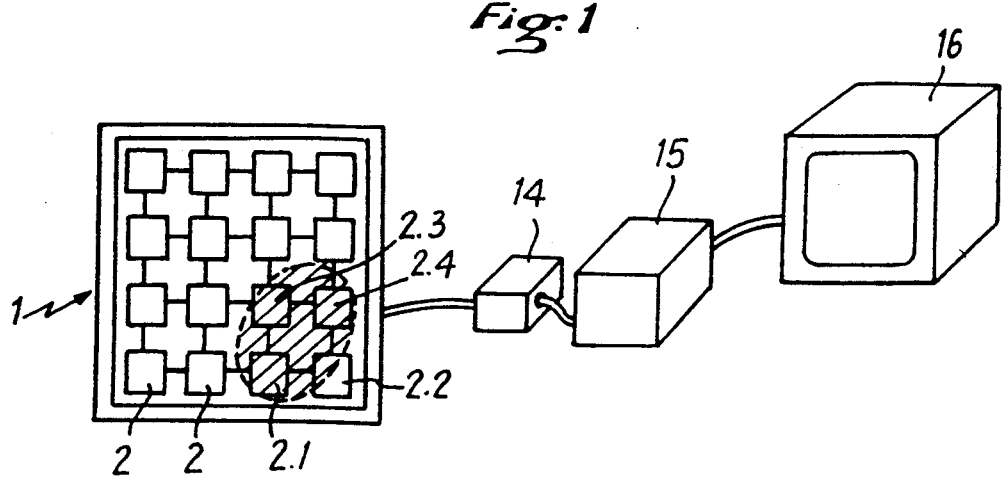
FIG. 1 is a diagram of a position-detecting device in accordance with the invention.
Figure 2:
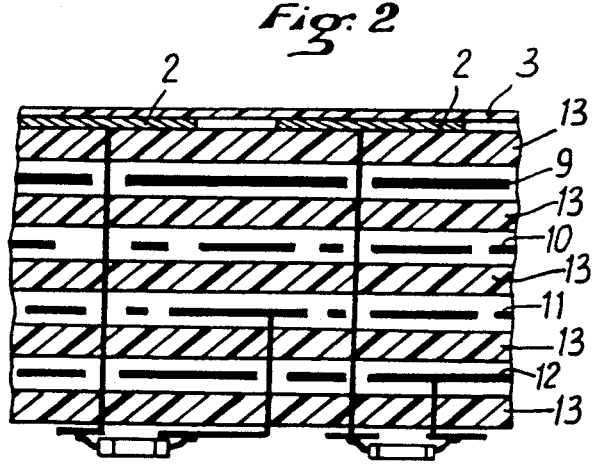
FIG. 2 is fragmentary section through the touch-sensitive pad.
Figure 3:
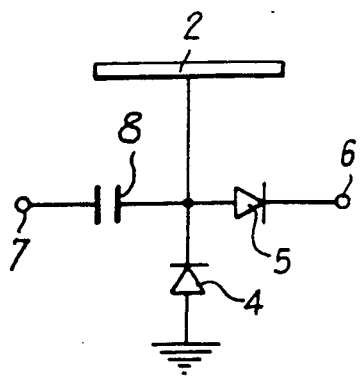
FIG. 3 is a diagram of a circuit for detecting the extent to which a detection area is overlapped.

With reference to the figures, the device in accordance with the invention comprises a touch-sensitive pad given an overall reference 1 and comprising a series of detection areas constituted by respective metal measurement plates 2 disposed on the surface of a multi-layer circuit, and preferably covered with an insulating protection layer 3.

Each measurement plate 2 is associated with a capacitive analog circuit for measuring the degree to which each plate is overlapped by the control member constituted by the finger of a user. Each capacitive analog circuit includes a first diode 4 and a second diode 5 connected in series with each other. The first diode 4 has its input terminal connected to the ground of the touch-sensitive pad 1 and the second diode 5 has its output terminal connected to an output terminal 6 from the pad. The two diodes 4 and 5 are disposed so as to conduct from pad ground towards output terminal 6. The measurement plate 2 is connected to the diodes 4 and 5 at an intermediate point on the line interconnecting these two diodes. The intermediate point between the diodes 4 and 5 is also connected to a drive terminal 7 via a capacitor 8. When driven, the analog circuit thus emits an output signal whose amplitude is a function of the degree by which the measurement plate 2 is overlapped by the finger of the user. In practice, the ground of the touch-sensitive pad is constituted by one layer 9 of the pad-forming multi-layer printed circuit, with drive lines, output lines, and link lines being constituted by circuits 10, 11, and 12 which are separated from one another and from the ground circuit by insulating layers 13. The components of the measuring circuit are preferably surface-mounting components mounted on the surface of the pad which is opposite to the surface containing the measurement plates 2.

The output terminals 6 of each analog measurement circuit are connected to an analog-to-digital converter 14 which is disposed between the touch-sensitive pad 1 and a computer 15 which is in turn connected to a video screen 16.

Figure 4:
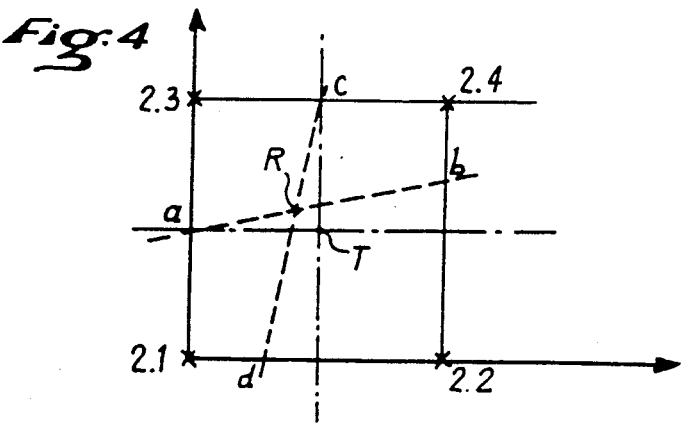
FIG. 4 is a graph for illustrating the method of determining the position of the control member on the basis of the measurements performed.

The computer is programmed to scan the detection areas 2 cyclically, i.e. to apply a drive signal to each of the input terminals 7 of the analog measurement circuits in sucession and to sense the corresponding output signal 6 which is then stored. In the preferred embodiment of the invention, the computer then selects, in each scan cycle, the four detection areas which give rise to output signals representing most overlap. In the example shown in FIG. 1, the position of the operator finger is represented by a dot-dashed line enclosing a shaded area and the corresponding detection areas are referenced 2.1, 2.2, 2.3, and 2.4. The same numeric references are marked on the graph of FIG. 4. Once the four areas having most overlap have been selected, the computer shifts its origin so as to cause it to coincide with one of the selected detection areas, for example the area 2.1 in the example shown. If the median point corresponding to the selected detection areas were then to be determined, it would turn out to be a point T which is equidistant from the four corners of the square formed by these selected areas. In order to obtain greater position accuracy, each corner of the square has a weighting coefficient applied thereto which is inversely proportional to the stored output signal amplitudes of the selected areas. If the amplitude of the output signal from area 2.1 is designated by A1, the amplitude of the output signal from area 2.2 by A2, the amplitude of the output signal from area 2.3 by A3, and the amplitude of the output signal from area 2.4 by A4, then points are determined as follows (ignoring a scale factor), point a has a Y-co-ordinate of $A3/(A1+A3)$; a point b has the same X-co-ordinate as the area 2.2 and has a Y-co-ordinate equal to $A4/(A2+A4)$; a point c has the same Y-co-ordinate as the area 2.3 and has an X-co-ordinate of $A4/(A3+A4)$; and a point d which has a zero Y-co-ordinate and has an X-co-ordinate equal to $A2/(A1+A2)$. The point of intersection of the lines a,b and c,d then constitutes a point R which is representative of the real position of the finger on the pad. The position of the point R may be used, for example, to move a pointer over the video screen 16 or to give a value to a data item whose value is then a function of the position of the operator's finger on the pad.

Although the pad 1 is shown in FIG. 1 as having only 16 detection areas 2, it will be understood that in reality the pad will generally be made with a much larger number of detection areas. The accuracy with which the point R can be determined is given by the degree of resolution which is possible as a function of the analog-to-digital converter used.

Naturally, the invention is not limited to the embodiment described and various different embodiments may be made without going beyond the scope of the invention. In particular, it is possible to use an inductive analog circuit instead of the capacitive analog circuit described. It is also possible to replace the coefficients which are inversely proportional to the detected output signal amplitudes, by coefficients which are appropriate to a given application.

We claim:

1. A device for detecting the position of a control member on a touch-sensitive pad comprising a series of detection areas, an analog circuit for attributing a detection coefficient to each area, which coefficient is a function of the amplitude of a signal emitted by said analog circuit, said amplitude being itself a function of the degree to which the detection area is overlapped by the control member, means for selecting detection areas having a high degree of overlap amongst all of the detection areas, means for attributing an origin to one of the areas having a high degree of overlap and means for determining a median point of said detection areas having a high degree of overlap as weighted by their detection coefficient.

2. A device according to claim 1, wherein the detection coefficient applied to a detection area is inversely proportional to the degree to which said area is overlapped.

3. A device according to claim 1, wherein each capacitive circuit includes a measurement plate disposed at the surface of the pad and connected to an intermediate point between two series-connected diodes, with one of the diodes being connected to pad ground and with the other diode being connected to an output terminal, said two didoes being disposed to conduct from ground towards the output terminal, with the intermediate point being additionally connected to a drive terminal via a capacitor.

4. A device according to claim 3, wherein the analog device is connected to a computer via an analog-to-digital converter.

* * * * *